United States Patent
Maxel et al.

(10) Patent No.: US 7,317,049 B2
(45) Date of Patent: Jan. 8, 2008

(54) RESIN COMPOSITION FOR A SHEET MOLDING COMPOUND AND METHOD THEREFOR

(75) Inventors: John M. Maxel, St. Charles, IL (US); Mike Jackson, Belding, MI (US)

(73) Assignee: Robroy Industries-Stahlin Enclosures, Belding, MI (US)

( * ) Notice: Subject to any disclaimer, the term of this patent is extended or adjusted under 35 U.S.C. 154(b) by 238 days.

(21) Appl. No.: 10/241,826

(22) Filed: Sep. 10, 2002

(65) Prior Publication Data

US 2003/0083414 A1 May 1, 2003

Related U.S. Application Data

(60) Provisional application No. 60/318,392, filed on Sep. 10, 2001.

(51) Int. Cl.
*C08K 5/098* (2006.01)
*C08K 3/22* (2006.01)

(52) U.S. Cl. ............... 524/399; 524/315; 524/359; 524/430; 524/433; 524/436; 427/407.3

(58) Field of Classification Search .......... 524/359, 524/399, 430, 433, 315, 436; 427/407.3
See application file for complete search history.

(56) References Cited

U.S. PATENT DOCUMENTS

| 4,683,254 | A |   | 7/1987  | Brannon et al. |
|-----------|---|---|---------|---------------|
| 5,972,272 | A | * | 10/1999 | Nagase et al. ............ 264/324 |
| 5,998,510 | A | * | 12/1999 | Butler ..................... 523/456 |
| 6,537,670 | B1 | * | 3/2003  | Sassi ...................... 428/412 |

\* cited by examiner

*Primary Examiner*—Tae H Yoon
(74) *Attorney, Agent, or Firm*—The Webb Law Firm

(57) ABSTRACT

A sheet molding compound used for the preparation of enclosures comprising a base resin in a range from 20.0 to 28.0% by weight; a thermoplastic resin in a range from 3.0 to 7.0% by weight; a styrene monomer in a range from 0.01 to 2.5% by weight; a first catalyst in a range from 0.1 to 0.7% by weight; a second catalyst in a range from 0.01 to 0.3 % by weight; a catalyst modifier in a range from 0.01 to 0.25% by weight; an inhibitor in a range from 0.01 to 0.25% by weight; a UV absorber in a range from 0.01 to 0.25% by weight; a wetting agent in a range from 0.1 to 1.00% by weight; a zinc stearate in a range from 1.0 to 2.0% by weight; optionally, at least one pigment in a range from 1.0 to 8.0% by weight; a flame retardant in a range from 30.0 to 73.0% by weight; a thickener in a range from 0.1 to 1.0% by weight; a glass fiber in a range from 10.0 to 30.0% by weight; and a thermoplastic powder in a range of 0.1 to 2.5% by weight.

20 Claims, 3 Drawing Sheets

RESIN COMPOSITION FOR A SHEET MOLDING COMPOUND AND METHOD THEREFOR

CROSS REFERENCE TO RELATED APPLICATIONS

This application claims the benefit of provisional application Ser. No. 60/318,392 filed Sep. 10, 2001, entitled "Resin Composition for a Sheet Molding Compound."

BACKGROUND OF THE INVENTION

1. Field of the Invention

This invention relates generally to the field of resin compositions for a sheet molding compound formulation and, more particularly, to a sheet molding compound formulation for the preparation of enclosures.

2. Description of Related Art

A long-standing problem with fiberglass or plastic electrical enclosures has been their inability to withstand the effects of ultraviolet radiation (UV) from attacking the polymer bond of the fiberglass material when installed in outdoor environments. After a period of time, this UV degradation can cause fiber blooming wherein the polymer material has been broken down and the glass fibers underneath have begun to show through to the surface. Many end users of such fiberglass enclosures view this as visually unappealing, while others view this degradation as having an effect on the physical properties of the material causing a potential failure of the enclosure. Current sheet molding compound (SMC) for enclosures contains brominated resin which, when used with antimony oxide, provides excellent fire retardancy. This type of system used in SMC formulations is also known as a halogenated system. Further, this type of SMC can give off small amounts of toxic emissions and produce black smoke when burned.

Typical SMC using a halogenated base resin system provides excellent chemical resistance and moldability for electrical enclosures. However, most of the halogenated base resin systems used for electrical enclosures lack the necessary chemical bonding strength to withstand the repeated UV attacks on the polymer chains, thereby causing a breakdown of the material which leads to fiber blooming and loss of gloss. Some manufacturers of enclosures have put UV absorbent additives in their current SMC formulations to provide for a small degree of UV resistance. Others have painted the outside of the enclosure, used car wax, or other means of providing protection of the enclosure when installing in outdoor environments. Additionally, some manufacturers have removed bromine from their SMC formulation and have utilized alumina trihydrate (ATH) in greater percentages to allow them to gain the required fire retardancy without the side effects of toxic emissions.

Newer technology such as neopentyl glycol (NPG) based resin systems have provided greater polymer chain bond strength in SMC formulations. These newer technologies in resin development can provide for both chemical resistance and UV resistance in one resin system. This one resin system coupled with the elimination of bromine and increasing amounts of ATH can provide increased protection against UV degradation and maintain the required fire retardancy rating while eliminating the small amounts of toxic emissions that are present in current halogenated resin systems.

It is an object of the present invention to overcome the above deficiencies by providing a UV stable SMC formulation that will provide chemical resistance and extend the usage of the enclosures when installed in outdoor environments. Another object of the present invention is to reduce toxic emissions and black smoke when the sheet molding compound is burned by eliminating the bromine and antimony oxide from within the base resin.

A further object of the present invention is to maintain the flammability ratings recognized within the enclosure industry without the toxic side effects of using a halogenated resin system.

SUMMARY OF THE INVENTION

The present invention provides a bromine-free composition used in a sheet molding compound formulation comprising:

a) 20.0 to 28.0% by weight, based on the total weight of the composition, of a polyester resin;

b) 3.0 to 7.0% by weight, based on the total weight of the composition, of a thermoplastic resin;

c) 0.01 to 2.5% by weight, based on the total weight of the composition, of a styrene monomer;

d) 0.1 to 0.7% by weight, based on the total weight of the composition, of a first catalyst;

e) 0.01 to 0.3% by weight, based on the total weight of the composition, of a second catalyst;

f) 0.01 to 0.25% by weight, based on the total weight of the composition, of a catalyst modifier;

g) 0.01 to 0.25% by weight, based on the total weight of the composition, of an inhibitor;

h) 0.01 to 0.25% by weight, based on the total weight of the composition, of a UV absorber;

i) 0.1 to 1.00% by weight, based on the total weight of the composition, of a wetting agent;

j) 1.0 to 2.0% by weight, based on the total weight of the composition, of a zinc stearate;

k) 30.0 to 73.0% by weight, based on the total weight of the composition, of a flame retardant;

l) 0.1 to 1.0% by weight, based on the total weight of the composition, of a thickener; and m) 0.1 to 2.5% by weight, based on the total weight of the composition, of a thermoplastic powder.

The SMC formulation comprises the above resin composition and glass fiber in a range from 10% to 30% by weight, such as 22% by weight. The glass fibers provide physical reinforcement to the SMC.

A method of making the resin composition comprises mixing the various liquid and powder components used in the resin composition at a specified percentage. All of the liquid components of the resin composition are mixed first. The powder components are then added to the liquid mixture and brought up to approximately 80° F. by friction heating. The thickener is then added at the specified percentage to bring the viscosity within a range of approximately 20,000-80,000 centipoise using a Brookfield viscometer.

A method of making the sheet molding compound comprises the steps of applying a first outer layer of the resin composition as previously described onto a plastic film, such as a nylon or polypropylene film and applying a second outer layer of the resin composition to a second plastic film. A center layer of the glass fiber is then placed in between the first outer layer and the second outer layer. All of the layers are then compacted together wherein the glass fibers are disbursed throughout the resin composition.

DETAILED DESCRIPTION OF THE INVENTION

Figure 1:
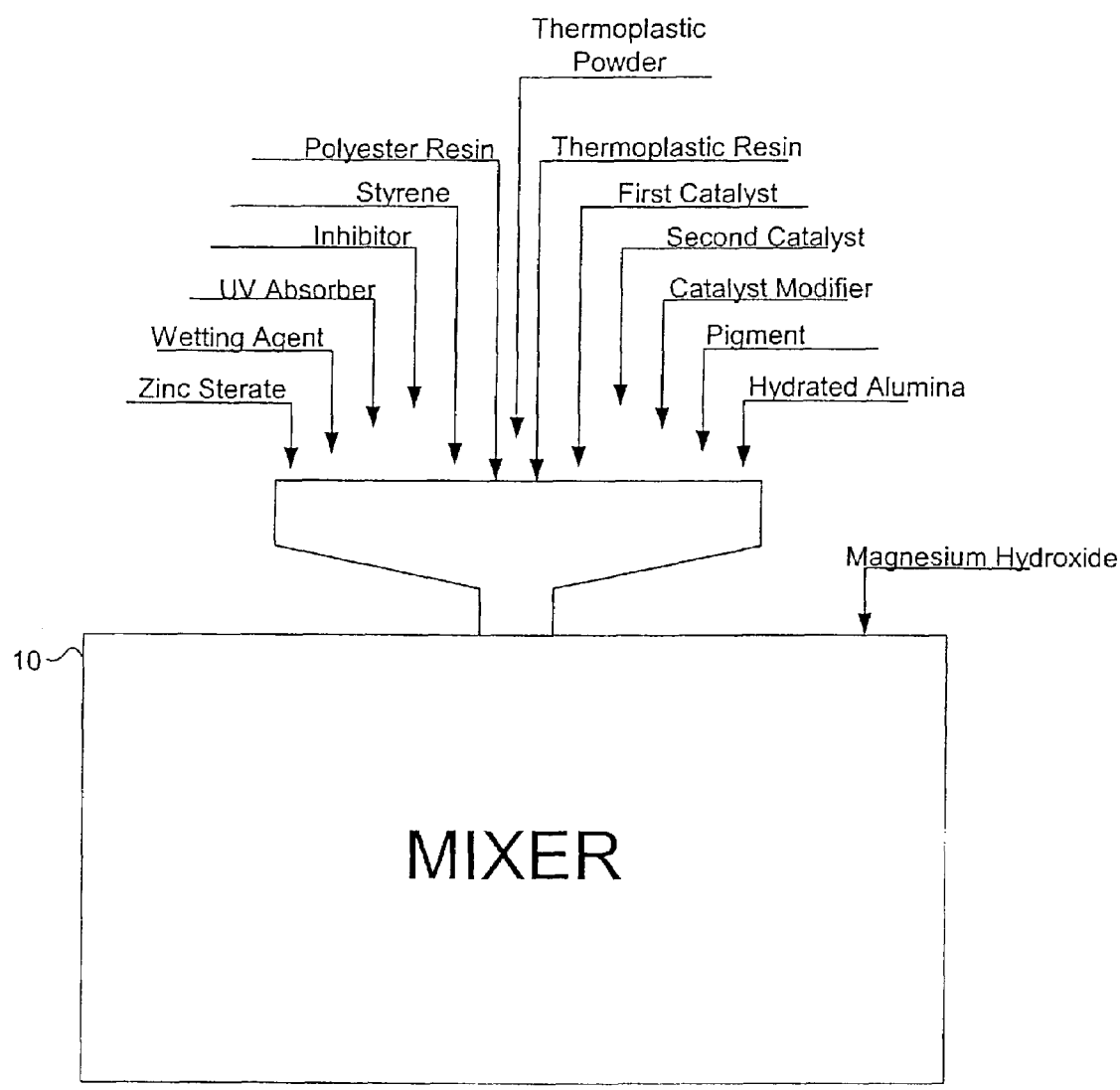
FIG. 1 shows a method of making the resin composition in accordance with the present invention.

In the following discussion, all numbers expressing dimensions, physical characteristics, processing parameters, quantities of ingredients, reaction conditions, and the like used in the specification and claims are to be understood as being modified in all instances by the term "about". Accordingly, unless indicated to the contrary, the numerical values set forth in the following specification and claims are approximations that may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between, and inclusive of, the minimum value of 1 and the maximum value of 10; that is, subranges beginning with a minimum value of 1 or more and ending with a maximum value of 10 or less, e.g., 5.5 to 10. Additionally, all percentages disclosed herein are "by weight" based on a total weight of the composition unless indicated to the contrary.

The present invention provides a bromine-free resin composition used in a sheet molding compound (SMC) formulation. The resin composition includes a base resin, such as unsaturated polyester resin in a range from 20.0% to 28.0% by weight, for example 21.70% by weight. A second component in the resin composition includes a thermoplastic resin, such as a thermoplastic polymer dissolved in styrene, in a range from 3.0 to 7.0% by weight, such as 4.1% by weight. One suitable thermoplastic resin is Co LP 8634 commercially available from Interplastic Corporation. The thermoplastic resin provides for shrink control to the SMC. A third component includes a styrene monomer used in a range from 0.01% to 2.5% by weight, such as 1.76% by weight, wherein the styrene monomer bonds the polymer chains. A fourth component includes a first catalyst used in a range from 0.1% to 0.7% by weight, such as 0.52% by weight. The first catalyst is a finishing catalyst, which completes the reaction between the resin and the styrene monomer. Examples of the first catalyst include a blend of di-2-ethylhexyl phthalate, tert-butyl peroxy-2-ethylhexanoate and tert-butyl hydroperoxide, such as Luperox MC Catalyst commercially available from Elf Atochem. A fifth component includes a second catalyst or a fast reacting catalyst, such as peroxyester, in a range from 0.01% to 0.3% by weight, such as 0.05% by weight. One suitable second catalyst is Luperox 26P50 commercially available from Elf Atochem. A sixth component includes a catalyst modifier in a range from 0.01% to 0.25% by weight, such as 0.01% by weight, wherein the reaction between the thermoplastic resin and the styrene is delayed at lower temperatures. One suitable catalyst modifier is a p-benzoquinone solution such as PowerBloc 10-P commercially available from Chem Pak International. PowerBloc 10-P is a p-benzoquinone solution that includes 89.95% to 90.05 percent by weight of a stabilizing diluent and 9.95% to 10.05% by weight of p-benzoquinone. A seventh component includes an inhibitor such as a cresol that inhibits the catalyst reaction while in storage and is used in a range from 0.0 1% to 0.25% by weight, such as 0.04% by weight. One suitable inhibitor is a BHT inhibitor commercially available from Uniroyal Chemicals. An eighth component includes a UV absorber, such as benzophenone, in a range from 0.01% to 0.25% by weight, such as 0.17% by weight. One suitable UV absorber is CYASORB UV9 commercially available from CYTEC Industries. A ninth component includes a wetting agent in a range from 0.1% to 1.00% by weight, such as 0.77% by weight, wherein the wetting agent functions as a viscosity reducer. Examples of the chemical characterization of the wetting agent includes a solution of a copolymer with acidic groups. One suitable wetting agent is BYK 996 commercially available from Byk Chemie. A tenth component includes zinc stearate which is used as a mold release and can be used in a range from 1.0% to 2.0% by weight, such as 1.46% by weight. An eleventh component can optionally include various pigments for coloration. These various pigments may be used in a range from 1.0% to 8.0% by weight, such as 1.478% by weight. A twelfth component includes a hydrated alumina in a range from 30.0% to 73.0% by weight, such as 43.91% by weight, wherein the hydrated alumina in powder form is used as a flame retardant. One suitable hydrated alumina is AC 400 FR commercially available from Alumchem Corp. A thirteenth component includes magnesium hydroxide used as a thickener in a range from 0.1% to 1.0% by weight, such as 0.29% by weight. One suitable magnesium hydroxide is Mag H commercially available from CP Hall. A fourteenth component includes a polyolefin powder in a range of 0.1% to 2.5%, such as 1.17% by weight manufactured by EQUISTAR. The fourteen components can be in the form of a liquid, powder, or pelletized resin.

FIG. 1 shows an exemplary method of making the resin composition. The resin composition can be made using a mixer 10, such as a cowls mixer. The resin composition is usually made in batches but can also be made on a continuous system. Batch sizes can be of any desired size such as, but not limited to, from 10 to 4,000 pounds. In the following discussion, the weight percent values are based on the final weight of the composition. A batch size, preferably 900 pounds, is used to make the resin composition. First, all of the liquid components are added to the mixer 10 at the previously specified resin composition percentages and mixed. Second, all of the powder components except the thickener are added to the mixer 10 at the specified resin composition percentages and mixed with the liquid components. The components are thoroughly mixed and then brought up to approximately 80° F. due to friction between the mixer blades and the material. The material in a form of a paste has a viscosity in a range from 20,000 to 60,000 centipoise using a Brookfield viscometer with a TA spindle at 5 RPM. Next, the thickener is added to the unthickened paste material and mixed until the temperature is approximately 90° F. The viscosity of the thickened paste material which is the resin composition after approximately 20 minutes of mixing is in the range of from 20,000 to 80,000 centipoise using a Brookfield viscometer with a TA spindle at 5 RPM.

Figure 2:
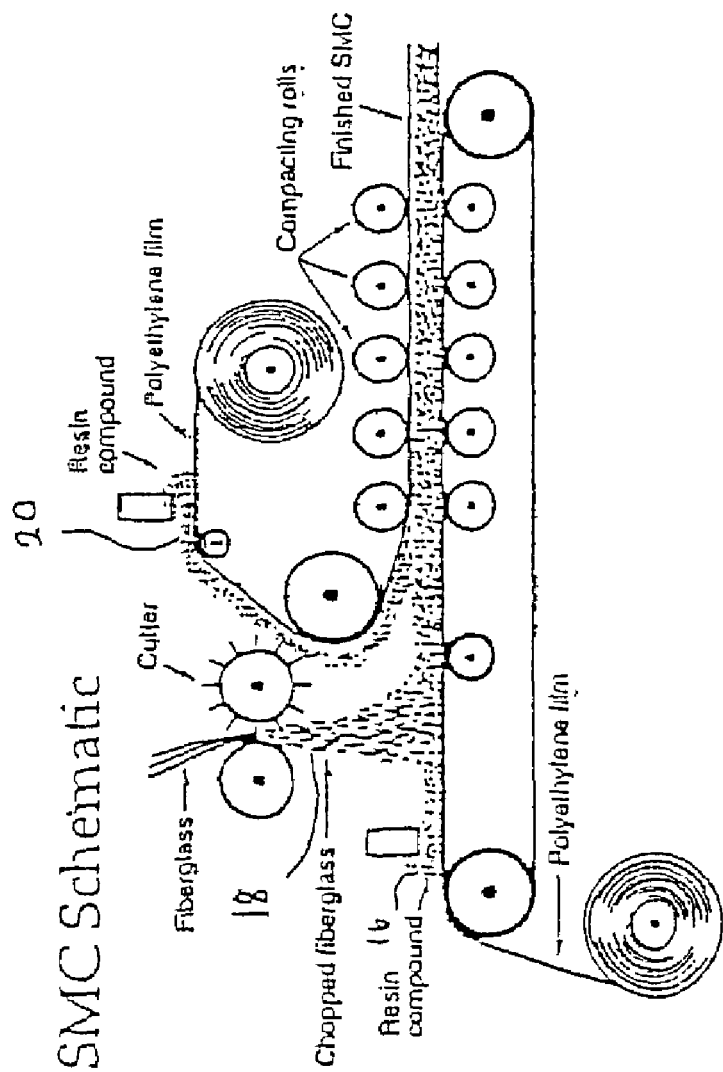
FIG. 2 shows a roll-type compaction machine used to make the sheet molding compound in accordance with the present invention.

FIG. 2 shows a roll-type compaction machine 14 used to make a sheet molding compound (SMC) from the previously described resin composition as which is in the form of a paste mixture. Here, a first layer of the resin composition paste 16 is clumped or placed onto a film of the roll-type compaction machine 14 at approximately 0.60" thick. The film, having a thickness ranging from 0.5 to 1.5 mil, usually 0.95 mil thick, can include a nylon film which is used as a carrier/styrene barrier. Next, a center layer of glass rovings 18 chopped to approximately ½" to 1" in length are randomly dropped onto the first layer of the resin composition paste 16 at a weight percent in a range from 10% to 30%, preferably 22% by weight. Next, a second layer of resin composition paste 20, approximately 0.60" thick, is applied over the chopped glass and then covered with a film. This film can also be a nylon, polypropylene, or polyethylene film. All of the layers are then run through a series of compaction rolls to disperse the glass fibers throughout the resin composition paste in order for the resin composition paste to fully coat the glass fiber strands and eliminate any trapped air within the SMC. The SMC is then festooned into tubs or rolls and moved into a maturation room where it is kept until an optimum molding viscosity is reached. The optimum molding viscosity of the SMC can be in a range of 15,000,000 to 80,000,000 centipoise using a Brookfield viscometer with a TF spindle at 1 RPM. When the optimum molding viscosity is reached, the finished SMC is released to production for molding into enclosures.

Figure 3:
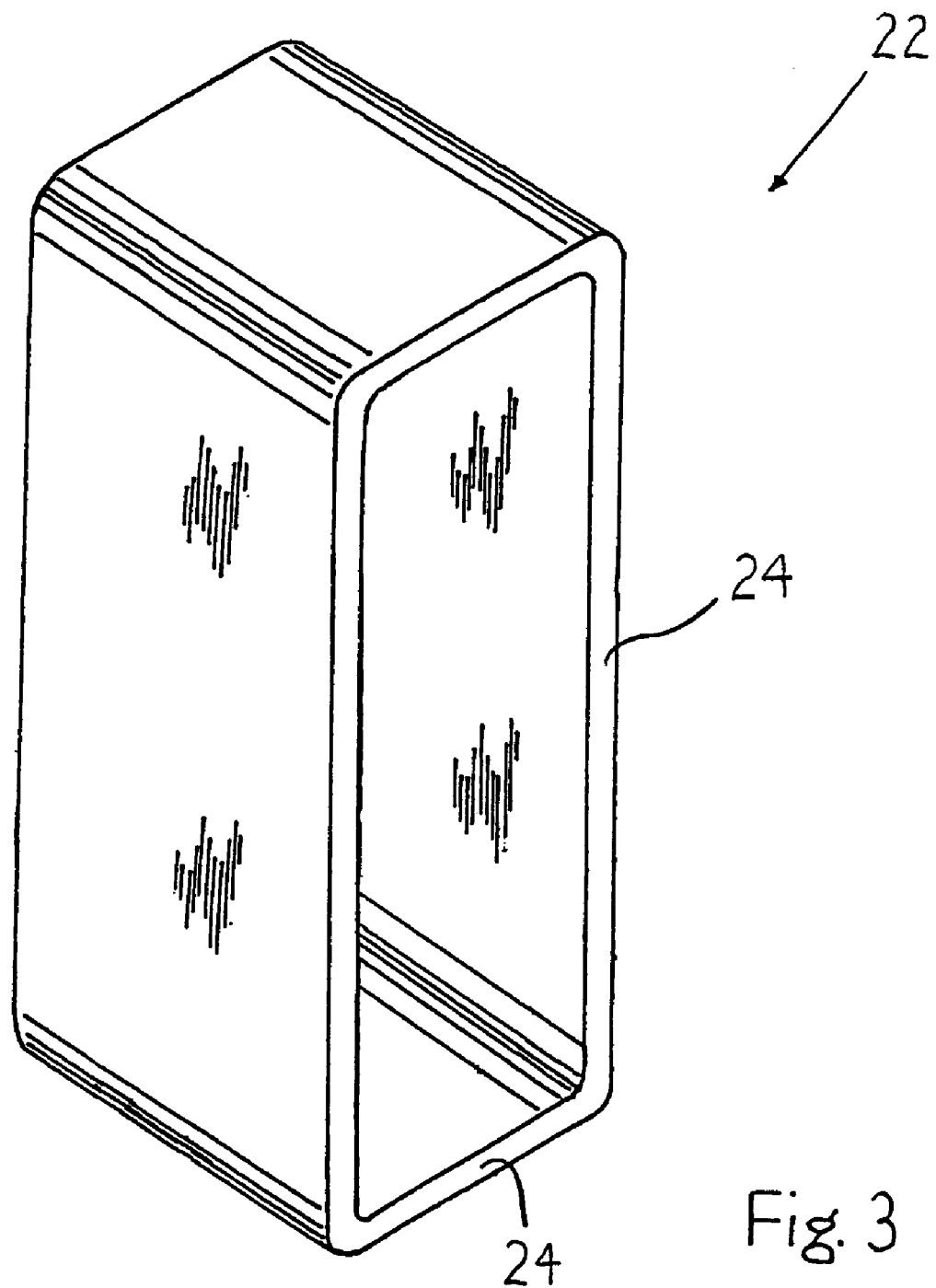
FIG. 3 is a perspective view of an electrical enclosure having walls, wherein the walls are formed from the sheet molding compound according to the present invention.

FIG. 3 shows an electrical enclosure 22 having walls 24, wherein the walls 24 comprise the bromine-free resin composition as previously discussed used in the sheet molding compound formulation of the present invention. Bulk molding compound (BMC) can also be used for molding into enclosures. Molding of BMC is well known in the molding art.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A composition used in a sheet molding compound formulation, said composition comprising:
   a) 20.0 to 28.0% by weight, based on the total weight of the composition, of a polyester resin;
   b) 3.0 to 7.0% by weight, based on the total weight of the composition, of a thermoplastic resin;
   c) 0.01 to 2.5% by weight, based on the total weight of the composition, of a styrene monomer;
   d) 0.1 to 0.7% by weight, based on the total weight of the composition, of a first catalyst;
   e) 0.01 to 0.3% by weight, based on the total weight of the composition, of a second catalyst;
   f) 0.01 to 0.25% by weight, based on the total weight of the composition, of a catalyst modifier;
   g) 0.01 to 0.25% by weight, based on the total weight of the composition, of an inhibitor;
   h) 0.01 to 0.25% by weight, based on the total weight of the composition, of a UV absorber;
   i) 0.1 to 1.00% by weight, based on the total weight of the composition, of a wetting agent;
   j) 1.0 to 2.0% by weight, based on the total weight of the composition, of a zinc stearate;
   k) 30.0 to 73.0% by weight, based on the total weight of the composition, of a flame retardant;
   l) 0.1 to 1.0% by weight, based on the total weight of the composition, of a thickener; and
   m) 0.1 to 2.5% by weight, based on the total weight of the composition, of a thermoplastic powder,
   wherein said composition does not contain bromine or antimony oxide.

2. The composition of claim 1, wherein said composition further comprising at least one pigment in a range from 1.0 to 8.0% by weight, based on the total weight of the composition.

3. The composition of claim 1, wherein the thermoplastic resin of said composition comprises a thermoplastic polymer dissolved in styrene.

4. The composition of claim 1, wherein the first catalyst of said composition comprises a blend of di-2-ethylhexyl phthalate, tert-butyl peroxy-2-ethylhexanoate and tert-butyl hydroperoxide.

5. The composition of claim 1, wherein the second catalyst of said composition comprises a peroxyester.

6. The composition of claim 1, wherein the catalyst modifier of said composition is used to delay the reaction between the thermoplastic resin and the styrene.

7. The composition of claim 1, wherein the inhibitor of said composition comprises a cresol for inhibiting the catalyst reaction of the composition.

8. The composition of claim 1, wherein the UV absorber of said composition comprises benzophenone.

9. The composition of claim 1, wherein the wetting agent of said composition comprises a solution of copolymer with acidic groups for reducing the viscosity of the composition.

10. The composition of claim 1, wherein the flame retardant of said composition comprises hydrated alumina.

11. The composition of claim 1, wherein the thickener of said composition comprises magnesium hydroxide.

12. A sheet molding compound, said sheet molding compound comprising:
   a) 20.0 to 28.0% by weight, based on the total weight of the compound, of a polyester resin;
   b) 3.0 to 7.0% by weight, based on the total weight of the compound, of a thermoplastic resin;
   c) 0.01 to 2.5% by weight, based on the total weight of the compound, of a styrene monomer;
   d) 0.1 to 0.7% by weight, based on the total weight of the compound, of a first catalyst;
   e) 0.01 to 0.3% by weight, based on the total weight of the compound, of a second catalyst;
   f) 0.01 to 0.25% by weight, based on the total weight of the compound, of a catalyst modifier;
   g) 0.01 to 0.25% by weight, based on the total weight of the compound, of an inhibitor;
   h) 0.01 to 0.25% by weight, based on the total weight of the compound, of a UV absorber;
   i) 0.1 to 1.00% by weight, based on the total weight of the compound, of a wetting agent;
   j) 1.0 to 2.0% by weight, based on the total weight of the compound, of a zinc stearate;
   k) 30.0 to 73.0% by weight, based on the total weight of the compound, of a flame retardant;
   l) 0.1 to 1.0% by weight, based on the total weight of the compound, of a thickener;
   m) 10.0 to 30.0% by weight, based on the total weight of the compound, of glass fiber; and
   n) 0.1 to 2.5% by weight, based on the total weight of the compound, of a thermoplastic powder, wherein said composition does not contain bromine or antimony oxide.

13. The compound of claim 12, wherein said compound further comprising at least one pigment in a range from 1.0 to-8.0% by weight, based on the total weight of the compound.

14. The compound of claim 12, wherein the thermoplastic resin of said compound comprises a thermoplastic polymer dissolved in styrene.

15. The compound of claim 12, wherein the first catalyst of said compound comprises a blend of di-2-ethylhexyl phthalate, tert-butyl peroxy-2-ethylhexanoate and tert-butyl hydroperoxide.

16. The compound of claim 12, wherein the second catalyst of said compound comprises peroxyester.

17. The compound of claim 12, wherein the catalyst modifier of said compound is used to delay the reaction between the thermoplastic resin and the styrene.

18. The compound of claim 12, wherein the inhibitor of said compound comprises a cresol for inhibiting the catalyst reaction of the composition.

19. The compound of claim 12, wherein the thermoplastic powder of said compound comprises a polyolefin powder.

20. A method of making a sheet molding compound comprising the steps of:
   (1) a first outer layer of a resin composition onto a first plastic film and a second outer layer of resin composition onto a second plastic film, wherein said composition does not contain bromine or antimony oxide and comprises:
      a) 20.0 to 28.0% by weight, based on the total weight of the composition, of a polyester resin;
      b) 3.0 to 7.0% by weight, based on the total weight of the composition, of a thermoplastic resin;
      c) 0.01 to 2.5% by weight, based on the total weight of the composition, of a styrene monomer;
      d) 0.1 to 0.7% by weight, based on the total weight of the composition, of a first catalyst;
      e) 0.01 to 0.3% by weight, based on the total weight of the composition, of a second catalyst;
      f) 0.01 to 0.25% by weight, based on the total weight of the composition, of a catalyst modifier;
      g) 0.01 to 0.25% by weight, based on the total weight of the composition, of an inhibitor;
      h) 0.01 to 0.25% by weight, based on the total weight of the composition, of a UV absorber;
      i) 0.1 to 1.00% by weight, based on the total weight of the composition, of a wetting agent;
      j) 1.0 to 2.0% by weight, based on the total weight of the composition, of a zinc stearate;
      k) 30.0 to 73.0% by weight, based on the total weight of the composition, of a flame retardant;
      l) 0.1 to 1.0% by weight, based on the total weight of the composition, of a thickener; and
      m) 0.1 to 2.5% by weight, based on the total weight of the composition, of a thermoplastic powder.
   (2) applying a center layer of glass fibers in between said first outer layer and said second outer layer; and
   (3) compacting all of said layers wherein said glass fibers are dispersed throughout said resin composition.
   (4) forming the enclosure wall from said compacted layers.

* * * * *

UNITED STATES PATENT AND TRADEMARK OFFICE
CERTIFICATE OF CORRECTION

PATENT NO.       : 7,317,049 B2                                           Page 1 of 1
APPLICATION NO.  : 10/241826
DATED            : January 8, 2008
INVENTOR(S)      : Maxel et al.

It is certified that error appears in the above-identified patent and that said Letters Patent is hereby corrected as shown below:

Column 8, Line 26 of Claim 20, "outer layer; and" should read -- outer layer; --

Column 8, Line 28 of Claim 20, "composition." should read -- composition; and --

Signed and Sealed this

Twenty-seventh Day of May, 2008

JON W. DUDAS
*Director of the United States Patent and Trademark Office*